(12) United States Patent
Mola

(10) Patent No.: US 12,141,301 B2
(45) Date of Patent: Nov. 12, 2024

(54) USING ENTROPY TO PREVENT INCLUSION OF PAYLOAD DATA IN CODE EXECUTION LOG DATA

(71) Applicant: Microsoft Technology Licensing, LLC, Redmond, WA (US)

(72) Inventor: Jordi Mola, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/559,480

(22) PCT Filed: May 2, 2022

(86) PCT No.: PCT/US2022/072044
§ 371 (c)(1),
(2) Date: Nov. 7, 2023

(87) PCT Pub. No.: WO2022/246359
PCT Pub. Date: Nov. 24, 2022

(65) Prior Publication Data
US 2024/0241974 A1     Jul. 18, 2024

(30) Foreign Application Priority Data

May 21, 2021    (LU) ........................................ 500189

(51) Int. Cl.
*H04L 29/06* (2006.01)
*G06F 11/34* (2006.01)
*G06F 21/62* (2013.01)

(52) U.S. Cl.
CPC .............. *G06F 21/62* (2013.01); *G06F 11/34* (2013.01)

(58) Field of Classification Search
CPC ................................. G06F 21/62; G06F 11/34
See application file for complete search history.

(56) References Cited

U.S. PATENT DOCUMENTS 7,158,979 B2    1/2007    Iverson et al.
7,213,113 B2    5/2007    Sahin et al.
(Continued)

FOREIGN PATENT DOCUMENTS

CN    102929780 A    2/2013
CN    103259806 A    8/2013
(Continued)

OTHER PUBLICATIONS

U.S. Appl. No. 15/921,883, filed Mar. 15, 2018.
(Continued)

*Primary Examiner* — Jason K Gee
(74) *Attorney, Agent, or Firm* — Workman Nydegger

(57) ABSTRACT

Using entropy to prevent inclusion of pay load data in code execution log data. Embodiments determine that a payload data item associated with code execution log data has entropy exceeding a defined entropy threshold and identify a particular executable code that interacted with the payload data item. Embodiments then take a preventative action that excludes the pay load data item from inclusion with a record of execution of the particular executable code. Examples of preventative actions include preventing the pay load data item from being exported from the computer system, preventing the pay load data item from being included in the code execution log data, and adding the payload data item to a block list in reference to the particular executable code.

15 Claims, 7 Drawing Sheets

(56) References Cited

U.S. PATENT DOCUMENTS

| | | |
|---|---|---|
| 7,444,677 B2 | 10/2008 | Marr |
| 7,644,440 B2 | 1/2010 | Sinha et al. |
| 8,522,047 B2 | 8/2013 | Von Platen et al. |
| 8,930,327 B2 | 1/2015 | Hossain et al. |
| 9,021,262 B2 | 4/2015 | Krajec et al. |
| 9,207,969 B2 | 12/2015 | Krajec |
| 9,501,654 B1 | 11/2016 | Greenberg et al. |
| 9,600,664 B1 | 3/2017 | Roth et al. |
| 9,716,704 B2 | 7/2017 | Milman |
| 10,042,737 B2 | 8/2018 | Mola |
| 10,178,031 B2 | 1/2019 | Krajec |
| 10,481,998 B2 | 11/2019 | Mola et al. |
| 2003/0105958 A1 | 6/2003 | Mcardle |
| 2003/0188231 A1 | 10/2003 | Cronce |
| 2004/0139305 A1 | 7/2004 | Arimilli et al. |
| 2004/0165728 A1 | 8/2004 | Crane et al. |
| 2005/0039031 A1 | 2/2005 | Mont et al. |
| 2007/0234430 A1 | 10/2007 | Goldsmid et al. |
| 2007/0250820 A1 | 10/2007 | Edwards et al. |
| 2008/0184367 A1* | 7/2008 | McMillan ............ G06F 21/563 726/23 |
| 2008/0275829 A1 | 11/2008 | Stull et al. |
| 2009/0132419 A1 | 5/2009 | Grammer et al. |
| 2010/0293618 A1 | 11/2010 | Medvedev et al. |
| 2012/0317644 A1* | 12/2012 | Kumar ................ G06F 21/552 726/24 |
| 2013/0160128 A1 | 6/2013 | Dolan-gavitt et al. |
| 2013/0185803 A1 | 7/2013 | Travis et al. |
| 2014/0019756 A1 | 1/2014 | Krajec |
| 2015/0052059 A1 | 2/2015 | Everhart et al. |
| 2015/0067654 A1 | 3/2015 | Krajec et al. |
| 2015/0113240 A1 | 4/2015 | Grech et al. |
| 2015/0161397 A1 | 6/2015 | Davis et al. |
| 2015/0248564 A1 | 9/2015 | Wei et al. |
| 2016/0212159 A1* | 7/2016 | Gupta ..................... G06F 21/54 |
| 2018/0375882 A1* | 12/2018 | Kallos .................. G06F 21/566 |
| 2019/0149320 A1 | 5/2019 | Keselman et al. |
| 2022/0318387 A1* | 10/2022 | Chen ...................... G06N 20/00 |

FOREIGN PATENT DOCUMENTS

| | | |
|---|---|---|
| CN | 105393220 A | 3/2016 |
| GB | 2459652 A | 11/2009 |
| WO | 2010028395 A1 | 3/2010 |
| WO | 2011069837 A1 | 6/2011 |
| WO | 2019177874 A1 | 9/2019 |

OTHER PUBLICATIONS

U.S. Appl. No. 18/557,539, filed May 2, 2022.

"Office Action Issued in Luxembourg Patent Application No. LU500189", Mailed Date: Jan. 26, 2022, 7 Pages.

"International Search Report and Written Opinion Issued in PCT Application No. PCT/US22/072044", Mailed Date: Jul. 22, 2022, 11 Pages.

Office Action Received for Chinese Application No. 201980018994.0, mailed on Jan. 24, 2024, 10 pages (English Translation Provided).

Communication under Rule 71(3) Received for European Application No. 22723533.0, mailed on Mar. 13, 2024, 7 pages.

U.S. Appl. No. 16/579,590, filed Sep. 23, 2019.

Decision to grant 97(1) Received for European Application No. 19712450.6, mailed on Sep. 15, 2022, 2 pages.

Chen, et al., "Control Flow Obfuscation with Information Flow Tracking", ACM, 2009, pp. 391-400.

Communication 71(3) Received for European Application No. 19712450.6, mailed on Jun. 15, 2022, 7 pages.

Hoverd, et al., "Environment Orientation: A Structured Simulation Approach for Agent-Based Complex Systems", Natural computing, 2015, pp. 83-97.

International Search Report and Written Opinion Issued in PCT Application No. PCT/US19/021249, Aug. 1, 2019, 17 pages.

Non-Final Office Action mailed on Mar. 28, 2019, in U.S. Appl. No. 15/921,883, 23 pages.

Notice of Allowance mailed on Jul. 22, 2020, in U.S. Appl. No. 16/579,590, 12 pages.

Notice of Allowance mailed on Jun. 21, 2019, in U.S. Appl. No. 15/921,883, 14 pages.

Office Action Received for Indian Application No. 202047034544, mailed on Apr. 7, 2022, 7 pages.

Taneja, et al., "Testing Software in Age of Data Privacy: A Balancing Act", ACM, 2011, pp. 201-211.

Decision to Grant pursuant to Article 97(1) received in European Application No. 22723533.0, mailed on Jul. 25, 2024, 2 pages.

Office Action Received for Chinese Application No. 201980018994.0, mailed on Aug. 26, 2024, 10 pages (English Translation Provided).

* cited by examiner

USING ENTROPY TO PREVENT INCLUSION OF PAYLOAD DATA IN CODE EXECUTION LOG DATA

CROSS-REFERENCE TO RELATED APPLICATIONS

The present application is a U.S. National Stage of International Application No. PCT/US2022/072044, filed on 2 May 2022, designating the United States and claiming the priority of Luxembourg Patent Application No. LU500189 filed with the Luxembourg Intellectual Property Office on 21 May 2021. All of the aforementioned applications are incorporated herein in their respective entireties by this reference.

TECHNICAL FIELD

The present disclosure relates to systems, methods, and devices that prevent the inclusion of sensitive payload data, such as personally identifiable information (PII), encryption keys, and passwords, from replayable execution traces and other execution logs.

BACKGROUND

Tracking down and correcting undesired software behaviors/faults is a core activity in software development. Undesired software behaviors can include many things, such as execution crashes, runtime exceptions, slow execution performance, incorrect data results, data corruption, and the like. Undesired software behaviors are triggered by a vast variety of factors such as data inputs, user inputs, race conditions (e.g., when accessing shared resources), etc. Given the variety of triggers, undesired software behaviors are often rare and seemingly random, and extremely difficult to reproduce. As such, it is often very time-consuming and difficult for a developer to identify a given undesired software behavior. Once an undesired software behavior has been identified, it is again often time-consuming and difficult to determine its root cause (or causes).

Developers use a variety of approaches to identify undesired software behaviors, and to then identify one or more locations in an application's code that cause the undesired software behavior. For example, developers often test different portions of an application's code against different inputs (e.g., unit testing). As another example, developers often reason about execution of an application's code in a debugger (e.g., by setting breakpoints/watchpoints, by stepping through lines of code, etc. as the code executes). As another example, developers often observe code execution behaviors (e.g., timing, coverage) in a profiler. As another example, developers often insert diagnostic code (e.g., trace statements) into the application's code. Each of these activities are aided by code execution logs, such as event logs generated by diagnostic code included in a subject application.

While conventional diagnostic tools (e.g., debuggers, profilers, etc.) have operated on "live" forward-executing code, an emerging form of diagnostic tools enable "historic" debugging (also referred to as "time travel" or "reverse" debugging), in which the at least a portion of an execution context (e.g., process, thread, etc.) of an executable computer program is recorded into code execution logs comprising one or more trace files (i.e., an execution trace). Using some tracing techniques, an execution trace contains "bit-accurate" historic execution trace data, which enables any recorded portion the traced execution context to be virtually "replayed" (e.g., via emulation) down to the granularity of individual instructions (e.g., machine code instructions, intermediate language code instructions, etc.). Thus, using bit-accurate trace data, diagnostic tools enable developers to reason about a recorded prior execution of an executable program, as opposed to conventional debugging which is limited to a "live" forward execution. For example, using replayable execution traces, some historic debuggers provide user experiences that enable both forward and reverse breakpoints/watchpoints, that enable code to be stepped through both forwards and backwards, etc. Some historic profilers, on the other hand, are able to derive code execution behaviors (e.g., timing, coverage) from prior-executed code.

Replayable execution traces either explicitly or implicitly contain every input to, and every output from, each recorded instruction. Thus, replayable execution traces contain all data consumed or generated by traced code. When the traced code consumes or generates sensitive data items, such as PII, encryption keys, passwords, and the like, execution traces of that traced code also contains these sensitive data items. Even less rigorous forms of code execution logs, such as event logs generated by an application's diagnostic code, may include sensitive data items.

BRIEF SUMMARY

At least some embodiments described herein improve data security by using an entropy analysis to prevent inclusion of payload data in code execution log data. These embodiments are address a technical challenge of being able efficiently and reliably determine that particular data items should be considered to be sensitive data items (e.g., PII, encryption keys, passwords, and the like). These embodiments are based on an observation by the inventor that sensitive data items tend to have a relatively high entropy when compared to less sensitive data items (e.g., environment variables, mathematical constants, etc.). In embodiments, the entropy of a data item is considered intrinsically (i.e., by looking at a ratio of a number of bits of entropy versus a total length of the data item) and/or contextually (i.e., by determining a uniqueness of the value of a given data item in one code execution log data set when compared to the values of the data item in other code execution log data sets). Recognizing that sensitive data items have a relatively high entropy, these embodiments identify high entropy data items, and exclude inclusion of those data items in code execution log data, such as replayable execution traces, event logs, and the like.

In embodiments, excluding high entropy data items from code execution log data has a technical effect of promoting data security, by preventing sensitive data items from being inadvertently exposed through code execution log data. Additionally, excluding high entropy data items from code execution log data decreases the size of code execution log data by removing portions of data, including removing high-entropy data that often is not readily compressible, which has an additional technical effect of conserving computing resources; for example, decreasing the size of code execution log data conserves processing resources when analyzing that log data, and conserves the storage and network resources needed to store and transfer code execution log data.

In accordance with the foregoing, in some embodiments, method, systems, and computer products are directed to using entropy to prevent inclusion of payload data in code execution log data. These embodiments determine that a payload data item associated with code execution log data has entropy exceeding a defined entropy threshold. Based on determining that the payload data item has entropy exceeding the defined entropy threshold, these embodiments identify a particular executable code that interacted with the payload data item. These embodiments then take a preventative action that excludes the payload data item from inclusion with a record of execution of the particular executable code.

At least some additional, or alternative, embodiments described herein improve data security by removing up to all payload data from an execution trace, without harming the ability to do forms of execution trace analysis (e.g., code and/or data flow analysis, memory locality analysis, memory access pattern analysis, cache usage analysis, race condition analysis, buffer overflow analysis, traditional debugging, etc.) that do not rely on analysis of the payload data, itself. For example, embodiments process an execution trace to identify payload data items. For each identified payload data item, embodiments determine constraint(s) that execution of code that interacted with the data item has placed on the data item and replace a value of the data item in the execution trace with information that maintains those constraint(s). In embodiments, this information includes the executable code itself, a memory address of the data item, and/or data structured to preserve code flow (e.g., a replacement value for the data item, a specification of valid value(s) s for the data item, an instruction of a code path to follow, etc.).

In embodiments, excluding payload data from execution traces has a technical effect of promoting data security, by preventing sensitive data items from being inadvertently exposed through execution traces. Additionally, in embodiments, excluding payload data from execution traces can greatly increase the compressibility of those execution traces. Either way, excluding payload data from execution traces can dramatically decrease the size of execution traces, which has an additional technical effect of conserving computing resources; for example, decreasing the size of execution traces conserves processing resources when analyzing those execution traces, and conserves the storage and network resources needed to store and transfer execution traces.

In accordance with the foregoing, in some embodiments, method, systems, and computer products are directed to removing payload data from an execution trace. These embodiments identify a payload data item within an execution trace, and identify particular executable code that interacted with the payload data item. Based on the payload data item and the particular executable code, these embodiments determine one or more constraints that execution of the particular executable code has placed on the payload data item, and then replace a value of the payload data item in the execution trace with information maintaining the one or more constraints. In various embodiments, the one or more constraints comprise one or more of bytes of the particular executable code, a memory address corresponding to the payload data item, or data structured to preserve code flow, and the information maintaining the one or more constraints comprise one or more of the bytes of the particular executable code, the memory address corresponding to the payload data item, or the data structured to preserve code flow.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
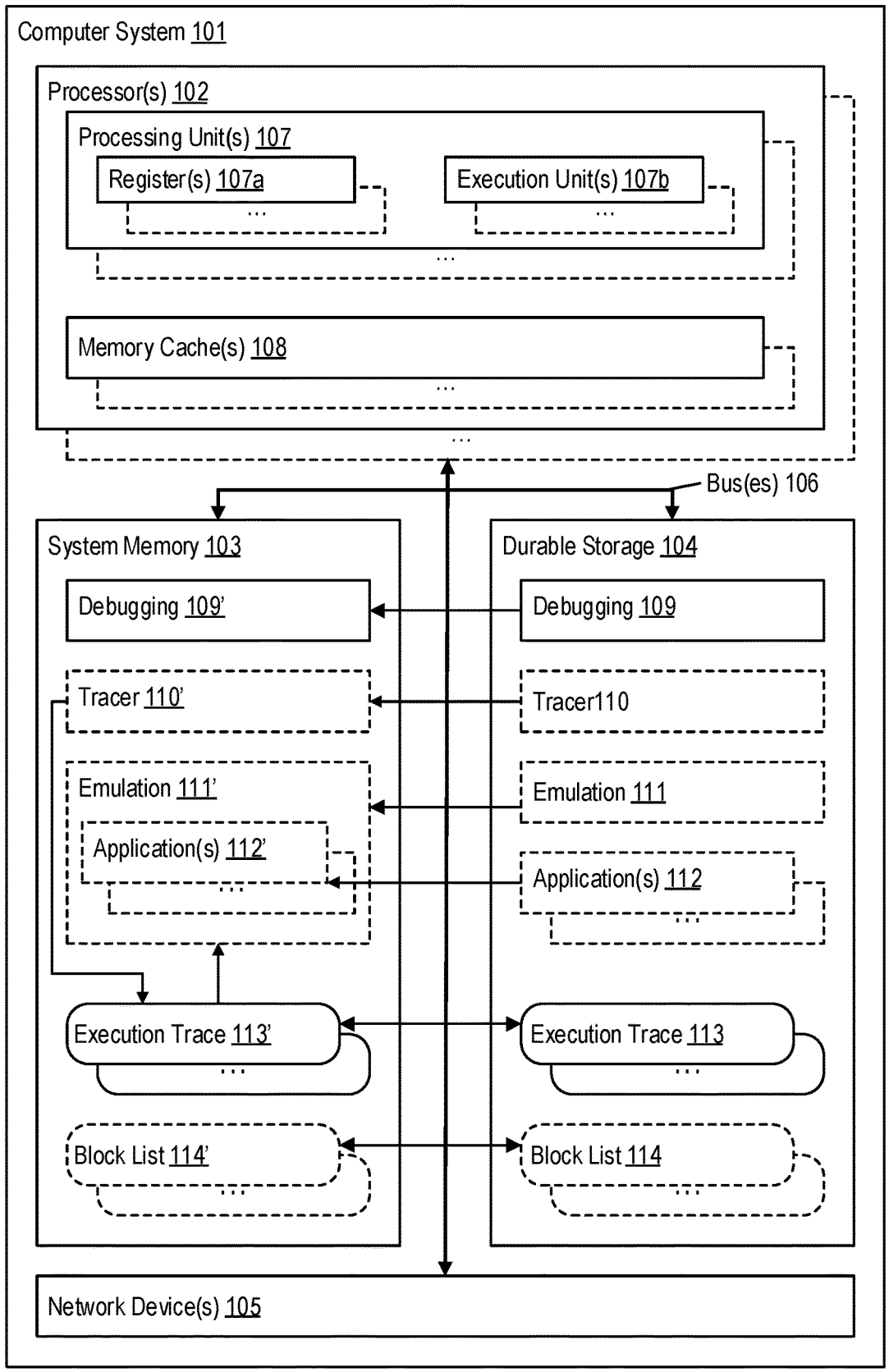
FIG. 1 illustrates an example computer architecture that facilitates one or more of using entropy to prevent inclusion of payload data in code execution log data or payload data removal from execution traces.

As mentioned, at least some embodiments described herein are directed to one or more of (i) embodiments for using entropy to prevent inclusion of payload data in code execution log data (such as an execution trace or an event log), or (ii) embodiments for payload data removal from execution traces. Either embodiment promotes data security and decreases the size of code execution log data/execution traces, while addressing a technical challenge of efficiently and reliably determining that particular data items should be considered to be sensitive data items.

In embodiments, an execution trace used by the embodiments herein is generated by one or more of a variety of historic debugging technologies. In general, historic debugging technologies record or reconstruct the state of an execution context (e.g., process, thread, etc.) at various times as code of a corresponding executable computer program executes, in order to enable that execution context to be at least partially replayed from that execution state. The fidelity of that virtual execution varies depending on what traced execution state is available.

In one example, some classes of historic debugging technologies, referred to herein as time-travel debugging, continuously record a bit-accurate trace of an execution context. This bit-accurate trace can then be used later to faithfully replay that execution context's prior execution down to the fidelity of individual code instructions. For example, a bit-accurate trace records information sufficient to reproduce initial processor state for at least one point in an execution context's prior execution (e.g., by recording a snapshot of processor registers), along with the data values that were read by the executable instructions as they executed after that point in time (e.g., the memory reads). This bit-accurate trace can then be used to replay execution of those executable instructions (starting with the initial processor state) based on supplying the instructions with the recorded reads.

Another class of historic debugging technology, referred to herein as branch trace debugging, relies on reconstructing at least part of an execution context's state based on working backwards from a dump or snapshot (e.g., a crash dump) that includes a processor branch trace (i.e., which includes a record of whether or not branches were taken). These technologies start with values (e.g., memory and register) from this dump or snapshot and, using the branch trace to at least partially determine code execution flow, iteratively replay the code instructions that executed as part of the execution context, backwards and forwards, in order to reconstruct intermediary data values (e.g., register and memory) used by the code instructions until those values reach a steady state. These techniques may be limited in how far back they can reconstruct data values, and how many data values can be reconstructed. Nonetheless, the reconstructed historical execution data can be used for historic debugging.

Yet another class of historic debugging technology, referred to herein as replay and snapshot debugging, periodically records full snapshots of an execution context's memory space and processor registers while it executes. If the execution context relies on data from sources other than the execution context's own memory, or from a non-deterministic source, in embodiments these technologies also record such data along with the snapshots. These technologies then use the data in the snapshots to replay the execution of an executable program's code between snapshots.

FIG. 1 illustrates an example computing environment 100 that facilitates one or more of using entropy to prevent inclusion of payload data in code execution log data or payload data removal from execution traces. As illustrated, computing environment 100 includes a computer system 101 (e.g., a special-purpose or general-purpose computing device), which includes a processor 102 (or a plurality of processors). As shown, in addition to processor 102, computer system 101 also includes system memory 103, durable storage 104, and potentially a network device 105 (or a plurality of network devices), which are communicatively coupled to each other, and to the processor 102, using at least one communications bus 106.

Embodiments within the scope of the present invention can include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media (e.g., system memory 103 and/or durable storage 104) that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network (e.g., network device 105) or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (not shown), and then eventually transferred to computer system RAM (e.g., system memory 103) and/or to less volatile computer storage media (e.g., durable storage 104) at the computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, machine code instructions (e.g., binaries), intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As shown in FIG. 1, in embodiments the processor 102 includes, for example, a processing unit 107 (or a plurality of processing units) and a memory cache 108 (or a plurality of memory caches). Each processing unit 107 (e.g., processor core) loads and executes machine code instructions on at least one of a plurality of execution units 107b. During execution of these machine code instructions, the instructions can use registers 107a as temporary storage locations, and can read and write to various locations in system memory 103 via the memory cache 108. Each processing unit 107 executes machine code instructions that are defined by a processor instruction set architecture (ISA). The particular ISA of each processor 102 can vary based on processor manufacturer and processor model. Common ISAs include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other ISAs exist and can be used by the present invention. As generally understood, a machine code instruction is the smallest externally-visible (i.e., external to the processor) unit of code that is executable by a processor.

Registers 107a are hardware storage locations that are defined based on the ISA of the processor 102. Registers 107a are read from and/or written to by machine code instructions, or a processing unit 107, as those instructions execute at execution units 107b. Registers 107a are commonly used to store values fetched from the memory cache 108 for use as inputs to executing machine code instructions, to store the results of executing machine code instructions, to store a program instruction count, to support maintenance of a thread stack, etc. In some embodiments, registers 107a include "flags" that are used to signal some state change caused by executing machine code instructions (e.g., to indicate if an arithmetic operation cased a carry, a zero result, etc.). In some embodiments, registers 107a include one or more control registers (e.g., which are used to control different aspects of processor operation), and/or other processor model-specific registers (MSRs).

The memory cache 108 temporarily caches blocks of system memory 103 during execution of machine code instructions by processing unit 107. In some implementations, the memory cache 108 includes one or more "code" portions that cache portions of system memory 103 storing application code, as well as one or more "data" portions that cache portions of system memory 103 storing application runtime data. If a processing unit 107 requests data (e.g., code or application runtime data) not already stored in the memory cache 108, then the processing unit 107 initiates a "cache miss," causing one or more blocks of data to be fetched from system memory 103 and influxed into the memory cache 108—while potentially replacing and "evicting" some other data already stored in the memory cache 108 back to system memory 103.

As illustrated, the durable storage 104 stores computer-executable instructions and/or data structures representing executable software components; correspondingly, during execution of this software at processor 102, one or more portions of these computer-executable instructions and/or data structures are loaded into system memory 103. For example, the durable storage 104 is shown as storing computer-executable instructions and/or data structures corresponding to a debugging component 109, and as potentially storing computer-executable instructions and/or data structures corresponding to one or more of a tracer component 110, an emulation component 111, or an application 112 (or a plurality of applications). In embodiments, the durable storage 104 also store data, such as replayable execution traces 113 (which are, for example generated by the tracer component 110 using one or more of the historic debugging technologies described above), a block list 114 (or a plurality of block lists) generated and/or used by the debugging component 109, etc.

In some embodiments, under direction of the debugging component 109, the tracer component 110 records or "traces" execution of an application 112 into one or more of replayable execution traces 113. In some embodiments, the tracer component 110 records execution of an application 112 when that execution is a "live" execution on processor 102 directly, when that execution is a "live" execution on processor 102 via a managed runtime, and/or when that execution is an emulated execution via the emulation component 111. Thus, FIG. 1 also shows that in some embodiments the debugging component 109 and the tracer component 110 are loaded into system memory 103 (i.e., debugging component 109' and tracer component 110'). An arrow between tracer component 110' and replayable execution traces 113' indicates that the tracer component 110' records trace data into one or more of replayable execution traces 113', which may then be persisted to the durable storage 104 as one or more of replayable execution traces 113.

Figure 5:
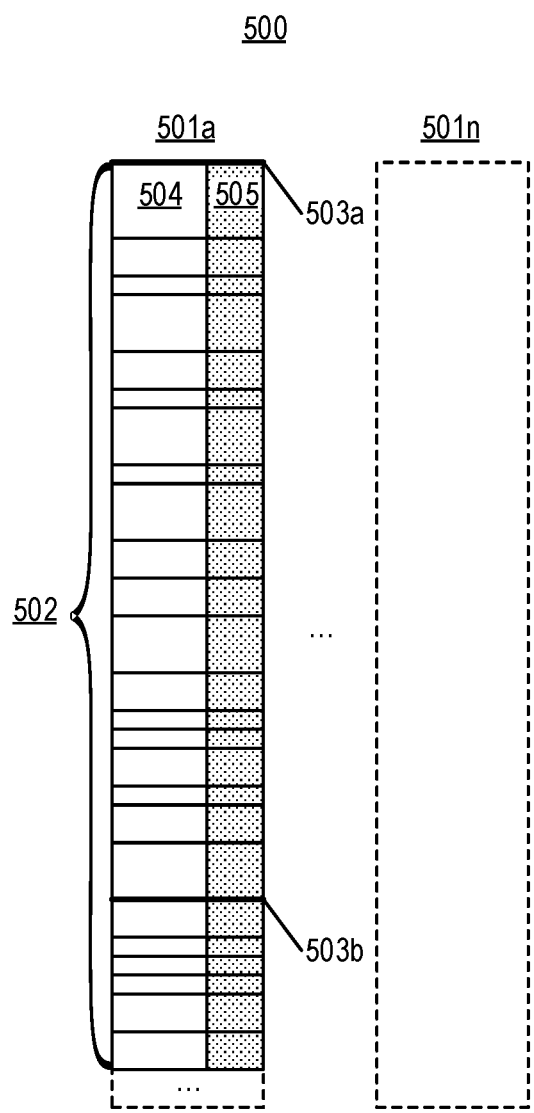
FIG. 5 illustrates an example of an execution trace.

FIG. 5 illustrates an example of an execution trace. In particular, FIG. 5 illustrates an execution trace 500 that includes a plurality of data streams (i.e., data streams 501a-501n). In embodiments, each data stream represents execution of a different execution context, such as a different thread that executed from application 112. In an example, data stream 501a records execution of a first thread of application 112, while data stream 501n records an $n^{th}$ thread of application 112. As shown, data stream 501a comprises a plurality of data packets 502. Since the particular data logged in each of data packets 502 can vary, these data packets are shown as having varying sizes. In embodiments, when using time-travel debugging technologies, one or more of data packets 502 records the inputs (e.g., register values, memory values, etc.) to one or more executable instructions that executed as part of this first thread of application 112. In embodiments, memory values are obtained as influxes to memory cache 108 and/or as uncached reads. In embodiments, data stream 501a also includes one or more key frames (e.g., key frames 503a and 503b), each capturing sufficient information (e.g., such as a snapshot of register and/or memory values) to enable the prior execution of the thread to be replayed-starting at the point of the key frame and proceeding forward.

In embodiments, an execution trace also includes the actual code that was executed. Thus, in FIG. 5, each of data packets 502 is shown as including a data inputs portion 504 (non-shaded) and a code portion 505 (shaded). In embodiments, the code portion 505 of each of data packets 502, if present, includes the executable instructions that executed based on the corresponding data inputs. In other embodiments, however, an execution trace omits the actual code that was executed, instead relying on having separate access to the executable code (e.g., a copy of application 112). In these other embodiments, each data packet specifies an address or offset to an appropriate executable instruction in an application binary image. Although not shown, it is possible that the execution trace 500 includes a data stream that stores one or more of the outputs of code execution. It is noted that used of different data input and code portions of a data packet is for illustrative purposes only, and that the same data could be stored in a variety of manners, such as by the use of multiple data packets.

If there are multiple data streams, in embodiments these data streams may include sequencing events. Each sequencing event records the occurrence of an event that is orderable across different execution contexts, such as threads. In one example, sequencing events correspond to interactions between the threads, such as accesses to memory that is shared by the threads. Thus, for instance, if a first thread that is traced into a first data stream (e.g., data stream 501a) writes to a synchronization variable, a first sequencing event is recorded into that data stream (e.g., data stream 501a). Later, if a second thread that is traced into a second data stream (e.g., data stream 501n) reads from that synchronization variable, a second sequencing event is recorded into that data stream (e.g., data stream 501n). These sequencing events are inherently ordered. For example, in some embodiments each sequencing event is associated with a monotonically incrementing value, with the monotonically incrementing values defining a total order among the sequencing events. In one example, a first sequencing event recorded into a first data stream is given a value of one, a second sequencing event recorded into a second data stream is given a value of two, etc.

In some embodiments, under direction of the debugging component 109, the emulation component 111 emulates execution of code of executable entities, such as application 112, based on execution state data obtained from one of replayable execution traces 113. Thus, FIG. 1 shows that in some embodiments the debugging component 109 and the emulation component 111 are loaded into system memory 103 (i.e., debugging component 109' and emulation component 111'), and that execution of an application 112 is emulated within the emulation component 111' (i.e., application 112').

Figure 4:
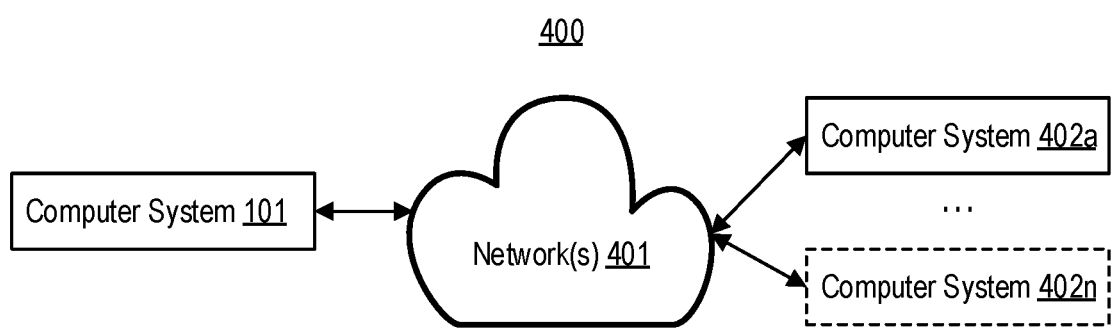
FIG. 4 illustrates an example computing environment in which the computer system of FIG. 1 is connected to one or more other computer systems over one or more networks.

In some embodiments, computer system 101 is part of a networked computing environment, in which computer system 101 is connected (e.g., using network device 105) to one or more remote computer systems that each includes one or more of a corresponding debugging component, a corresponding tracer component, or a corresponding emulation component. For example, FIG. 4 illustrates an example computing environment 400, showing computer system 101 of FIG. 1 as being connected to a remote computer system (or a plurality of remote computer systems), such as remote computer system 402a to remote computer system 402n, over a network 401 (or a plurality of networks). In one embodiment, computer system 101 receives one or more of replayable execution traces 113 over network 401 from one or more remote computer systems that each includes a tracer component (e.g., for analysis of those trace(s) by the debugging component 109 at computer system 101). In another embodiment, computer system 101 records one or more of replayable execution traces 113 using the tracer component 110, and sends those trace(s) over network 401 to one or more remote computer systems that each includes one or more of a debugging component or an emulation component (e.g., for analysis of those trace(s) by the remote computer system(s)). In embodiments, computer system 101 also communicates a block list 114 to, or from, one or more remote computer systems over network 401.

It is noted that while, in some embodiments, the debugging component 109, the tracer component 110, and/or the emulation component 111 are each independent components or applications, in other embodiments they are alternatively integrated into the same application (such as a debugging suite), or are integrated into another software component—such as an operating system component, a hypervisor, a cloud fabric, etc. As such, those skilled in the art will also appreciate that the invention may be practiced in a cloud computing environment that includes computer system 101. For instance, while in some embodiments these components take the form of one or more software applications executed at a user's local computer, in other embodiments they take the form of a service provided by a cloud computing environment.

In embodiments, the debugging component 109 is a tool (e.g., a debugger, a profiler, a cloud service, etc.) that consumes one or more of replayable execution traces 113 as part of analyzing a prior execution of an application 112. As is now explained in more detail in connection with FIGS. 2 and 6, in embodiments the debugging component 109 provides functionality for using an entropy analysis to prevent inclusion of payload data in code execution log data, such as replayable execution traces 113. Additionally, or alternatively, as will be explained in more detail in connection with FIGS. 3 and 7, in embodiments the debugging component 109 provides functionality for removing payload data from replayable execution traces 113.

I. Using Entropy to Prevent Inclusion of Payload Data in Code Execution Log Data It was just mentioned that some embodiments of the debugging component 109 provide functionality for using an entropy analysis to prevent inclusion of payload data in code execution log data. These embodiments address a challenge that that sensitive data items (e.g., PII, encryption keys, passwords, and the like) can be very difficult to programmatically identify, by leveraging an observation that sensitive data items tend to have high entropy. Using this observation, these embodiments identify high entropy data items—such as the inputs to and the outputs from executable instructions, functions, and the like—and exclude inclusion of those data items in code execution log data, such as replayable execution traces, event logs, and the like.

As used herein, a data item is considered to have "high entropy" when an intrinsic and/or contextual entropy of the data item meets a defined threshold. In some embodiments, a data item is considered to have high intrinsic entropy (and thus high entropy) when a ratio between a number of bits of entropy in the data item versus a total number of bits in the data item exceeds a defined threshold. In an example, cryptographic keys and passwords tend to have high intrinsic entropy because they tend to contain a relatively large number of unique characters relative to a total number of characters in the key/password. Conversely, natural language text tends to have low intrinsic entropy because it tends to contain a relatively few number of unique characters relative to a total number of characters in the text. Notably, data items that have high intrinsic entropy have a relatively low internal character repetition when compared to data items that have low intrinsic entropy, and thus data items that have high intrinsic entropy have a low compressibility when compared to data items that have high intrinsic entropy. Conversely, data items that have low intrinsic entropy have a relatively high internal character repetition when compared to data items that have high intrinsic entropy, and thus data items that have low intrinsic entropy have a high compressibility when compared to data items that have low intrinsic entropy. Thus, in some embodiments, the compressibility of a data item is used to determine whether it is considered to have low intrinsic entropy or high intrinsic entropy.

In some embodiments, a data item is considered to have high contextual entropy (and thus high entropy) when a ratio between a number of times that a particular value of the data item versus a total number of times the data item appears in a collection of execution traces is below a defined threshold, or when a number of traces in which a particular value of the data item appears versus a total number of traces in a collection of execution traces is below a defined threshold. In an example, social security numbers tend to have high contextual entropy because, given a large collection of data collected over a number of computer systems, a given social security number would tend to appear rarely. Conversely, a state name tends to have low contextual entropy because, given a large collection of data collected over a number of computer systems, a given state name would tend to appear frequently.

In some embodiments, a computer system that generates the code execution log data takes an action to exclude inclusion of high-entropy data in code execution log data. In one example, during generation of one or more of replayable execution traces 113 by the tracer component 110 at computer system 101, the debugging component 109 at computer system 101 uses block list 114 and/or an intrinsic entropy analysis to identify high-entropy payload data items, and excludes those payload data items from those trace(s). In another example, during a post-processing of one or more of replayable execution traces 113 generated the debugging component 109 at computer system 101, the debugging component 109 at computer system 101 uses block list 114 and/or an intrinsic entropy analysis to identify high-entropy payload data items, and excludes those payload data items from those trace(s). Either way, high-entropy payload data items are excluded from code execution log data prior to that log data being exported from computer system 101 (e.g., to remote computer system 402a).

In other embodiments, a computer system that processes a collection of code execution log data takes an action to exclude inclusion of high-entropy data in future collections, by identifying code that interacts with that high-entropy data in block list 114, and by sending that block list 114 to one or more remote computer systems. In these embodiments, this computer system may also remove the high-entropy data items from the collection of code execution log data that was used to identify the high-entropy data items. In one example, while the debugging component 109 at computer system 101 processes a plurality of replayable execution traces 113 of application 112 that are received from a plurality of remote computer systems, the debugging component 109 uses intrinsic entropy analysis and/or a contextual entropy analysis to identify high-entropy payload data items in this plurality of execution traces. The debugging component 109 then adds those data items to a block list 114 (or block list 114' in system memory 103) based on a reference to the code that interacted with those data items, and distributes this block list 114 to the remote computer systems to prevent inclusion of those data items in future execution traces gathered from those remote computer systems. In embodiments, the debugging component 109 also removes these high-entropy payload data items from the plurality of execution traces.

Figure 2:
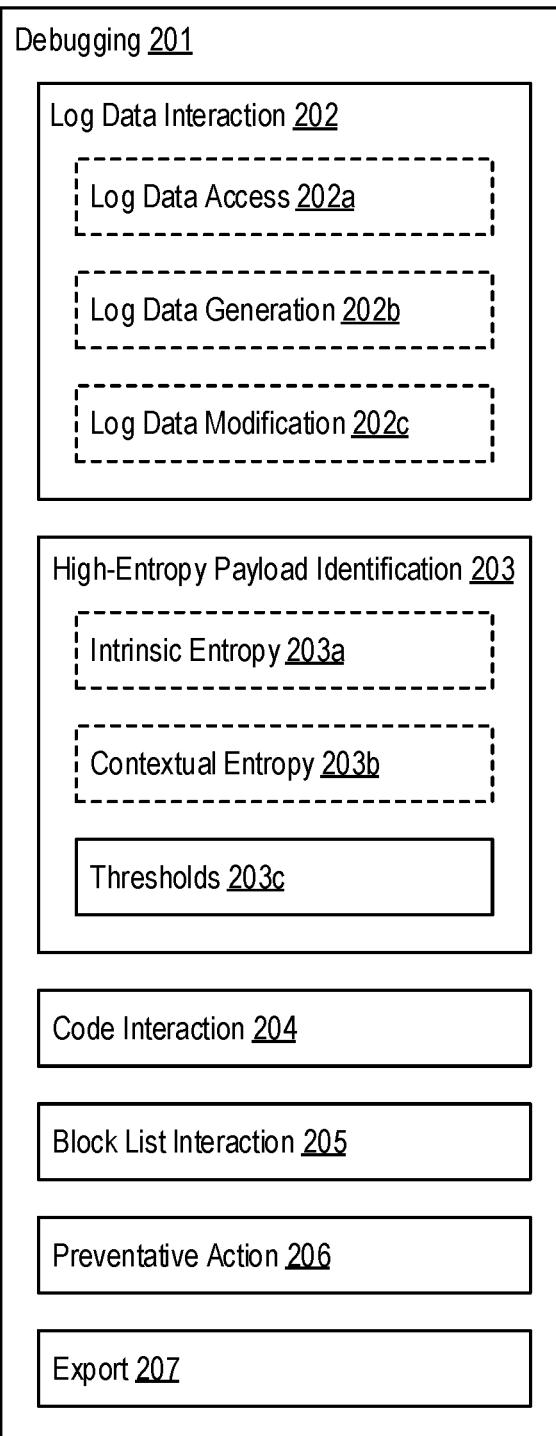
FIG. 2 illustrates additional detail of a debugging component that is configured to use entropy to prevent inclusion of payload data in code execution log data.

To further demonstrate these concepts, FIG. 2 illustrates an example 200 of a debugging component 201 (e.g., one embodiment of debugging component 109) that is configured to use entropy to prevent inclusion of payload data in code execution log data, including components (e.g., log data interaction component 202, high-entropy payload identification component 203, code interaction component 204, block list interaction component 205, preventative action component 206, export component 207, etc.) that operate to use entropy to prevent inclusion of payload data in code execution log data. The depicted components of the debugging component 201, including their sub-components represent various functions that the debugging component 201 might implement or utilize in accordance with various embodiments described herein. It will be appreciated, however, that the depicted components—including their identity, sub-components, and arrangement—are presented merely as an aid in describing various embodiments of the debugging component 201 described herein, and that these components are non-limiting to how software and/or hardware might implement various embodiments of the debugging component 201 described herein, or of the particular functionality thereof.

Debugging component 201 is described in connection with FIG. 6, which illustrates a flowchart of a method 600 for using entropy to prevent inclusion of payload data in code execution log data. Thus, the following discussion now refers to a method and method acts. Although the method acts may be discussed in certain orders, or may be illustrated in a flow chart as occurring in a particular order, no particular ordering is required unless specifically stated, or required because an act is dependent on another act being completed prior to the act being performed. In embodiments, instructions for implementing method 600 is are encoded as computer-executable instructions (e.g., debugging component 201) stored on a hardware storage device (e.g., durable storage 104) that are executable by a processor (e.g., processor 102) to cause a computer system (e.g., computer system 101) to perform method 600.

The log data interaction component 202 interacts with code execution log data, such as replayable execution traces 113 or other code execution logs such as event logs. As shown, in various implementations, the log data interaction component 202 includes one or more of a log data access component 202a (i.e., to access already existing code execution log data, such as replayable execution traces 113 stored in durable storage 104), a log data generation component 202b (i.e., to generate code execution log data, such as replayable execution traces 113), or a log data modification component 202c (i.e., to modify already existing code execution log data, such as replayable execution traces 113 stored in durable storage 104). While the types of code execution log data acted upon by the log data interaction component 202 can vary, in some embodiments, the code execution log data is a replayable execution trace, such as one of replayable execution traces 113.

The high-entropy payload identification component 203 identifies high-entropy payload data items, either in connection with generation of code execution log data (e.g., by tracer component 110), or in connection with post-processing of code execution log data. The code interaction component 204 identifies code that interacted with high-entropy payload data items, either from analyzing interactions of high-entropy payload data items with executed code, or by consulting block list 114.

Figure 6:
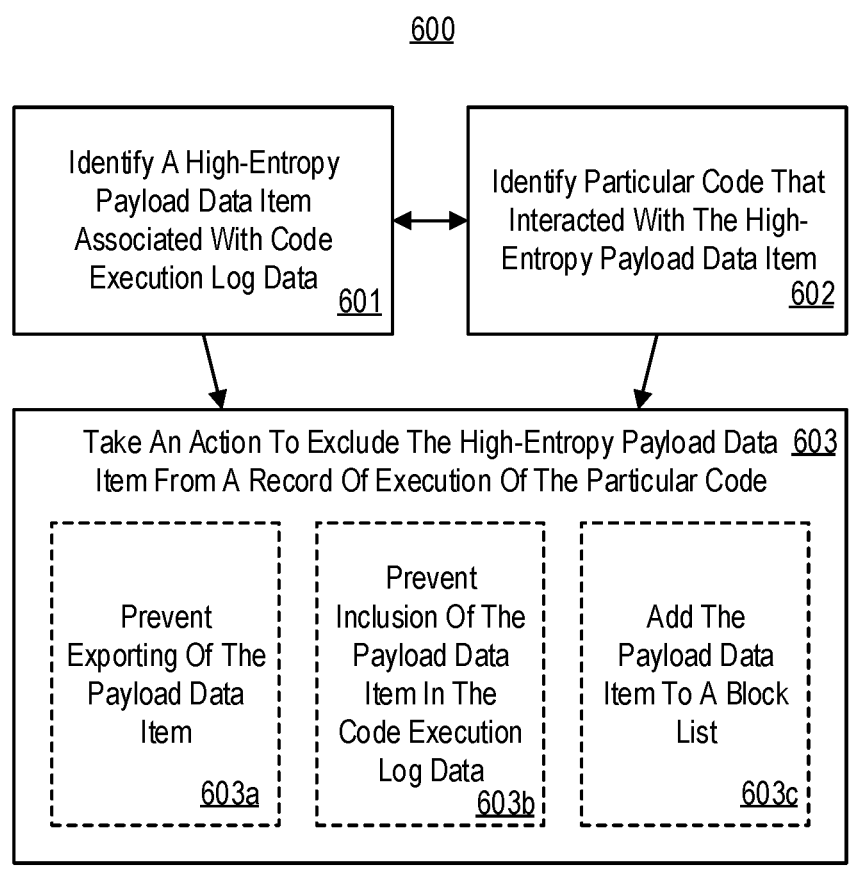
FIG. 6 illustrates a flow chart of an example method for using entropy to prevent inclusion of payload data in code execution log data.

Turning to FIG. 6, method 600 comprises an act 601 of identifying a high-entropy payload data item associated with code execution log data, and an act 602 of identifying particular code that interacted with the high-entropy payload data item. Act 601 and act 602 are illustrated without any particular ordering between the acts. In some embodiments, act 601 first identifies a high-entropy payload data item, and then act 602 identifies particular code that interacted with the high-entropy payload data item. In other embodiments, act identifies particular code that interacted with a high-entropy payload data item from block list 114, and then act 601 identifies the high-entropy payload data item as in item that the particular code interacted with.

In some embodiments, act 601 comprises determining that a payload data item associated with code execution log data has entropy exceeding a defined entropy threshold. In some embodiments, act 602 comprises identifying a particular executable code that interacted with the payload data item. In embodiments, act 601 and act 602 have a technical effect of identifying payload data that may be sensitive data, such as PII, cryptographic keys, passwords, etc., together with code that interacted with that payload data. Notably, identifying payload data that may be sensitive data in act 601, and identifying the code that interacted with sensitive data in act 602 enables data security to be improved by enabling this high-entropy payload data to be excluded from code execution log data.

As shown, the high-entropy payload identification component 203 includes thresholds 203c, which define when a computed entropy for a given data item can be considered to be "high entropy." As will be appreciated in view of the discussion of intrinsic and contextual entropy, in embodiments, these thresholds 203c are based on ratios.

As also shown, in some embodiments, the high-entropy payload identification component 203 includes an intrinsic entropy component 203a. In embodiments, the intrinsic entropy component 203a analyzes payload data based on its intrinsic entropy. Thus, in some embodiments of act 601, determining that the payload data item has entropy exceeding the defined entropy threshold comprises determining that the payload data item has intrinsic entropy exceeding the defined entropy threshold.

As discussed, a data item has high intrinsic entropy (and thus high entropy) when a ratio between a number of bits of entropy in the data item versus a total number of bits in the data item exceeds a defined threshold (i.e., thresholds 203c). Thus, in some embodiments of act 601, determining that the payload data item has intrinsic entropy exceeding the defined entropy threshold comprises computing a ratio of a number of bits of entropy in the payload data item versus a total number of bits in the payload data item. As also discussed, in some embodiments the compressibility of a data item is used to determine whether it has low intrinsic entropy (i.e., when it has relatively high compressibility), or whether it has high intrinsic entropy (i.e., when it has relatively low compressibility). Thus, Thus, in some embodiments of act 601, determining that the payload data item has intrinsic entropy exceeding the defined entropy threshold comprises computing a compressibility of the payload data item.

As also shown, in some embodiments, the high-entropy payload identification component 203 includes a contextual entropy component 203b. In embodiments, the contextual entropy component 203b analyzes payload data based on its contextual entropy. In some embodiments, a data item has high contextual entropy (and thus high entropy) when a ratio between a number of times that a particular value of the data item versus a total number of times the data item appears in a collection of execution traces is below a defined threshold (i.e., thresholds 203c). In other embodiments, a data item has high contextual entropy (and thus high entropy) when a number of traces in which a particular value of the data item appears versus a total number of traces in a collection of execution traces is below a defined threshold (i.e., thresholds 203c). Thus, in some embodiments of act 601, determining that the payload data item has entropy exceeding the defined entropy threshold comprises determining that the payload data item has contextual entropy exceeding the defined entropy threshold, the contextual entropy being relative to a plurality related payload data items identified from a plurality of related code execution logs.

In some embodiments, when identifying high-entropy payload data items in act 601, the high-entropy payload identification component 203 utilizes the block list interaction component 205 to identify known high-entropy payload data from block list 114, such as a block list received from a remote computer system over network 401. As discussed, in embodiments the block list 114 identifies high-entropy data items in reference to the code that interacted with the data item—such as code that consumed or generated the data item. Thus, in some embodiments of act 601, determining that the payload data item has entropy exceeding the defined entropy threshold comprises identifying the payload data item from a block list based at least on a reference to particular executable code (identified in act 602) that interacted with the payload data item.

In some embodiments, the high-entropy payload identification component 203 operates during a post-processing of code execution log data, such as by a computer system that generated the code execution log data, or by a computer system that receive the code execution log data from another computer system. Thus, in some embodiments of act 601, determining that the payload data item has entropy exceeding the defined entropy threshold comprises identifying the payload data item during a post-processing of the code execution log data. In other embodiments, the high-entropy payload identification component 203 operates during generation of code execution log data, such as during a trace recording by the tracer component 110. Thus, in some embodiments of act 601, determining that the payload data item has entropy exceeding the defined entropy threshold comprises identifying the payload data item during generation of the code execution log data.

As discussed, in act 602, the code interaction component 204 identifies particular executable code that interacted with the payload data item. In various embodiments, this interaction can be a consumption of the payload data item (in which, in act 602, identifying the particular executable code that interacted with the payload data item comprises identifying executable code that consumed the payload data item), or a generation of the payload data item (in which, in act 602, identifying the particular executable code that interacted with the payload data item comprises identifying executable code that generated the payload data item). The granularity with which the code interaction component 204 identifies executable code can vary, such as at the instruction level (in which, in act 602, identifying the particular executable code that interacted with the payload data item comprises identifying a particular executable instruction), at the function level (in which, in act 602, identifying the particular executable code that interacted with the payload data item comprises identifying a particular function), etc.

The preventative action component 206 takes a preventative action to prevent exporting of the payload data (e.g., by the export component 207), to prevent the payload data item from being included in code execution log data, and/or to add the payload data item to a block list. Turning to FIG. 6, method 600 comprises an act 603 of taking an action to exclude the high-entropy payload data item from a record of execution of the particular code. In some embodiments, act 603 comprises taking a preventative action that excludes the payload data item from inclusion with a record of execution of the particular executable code.

As mentioned, in some embodiments the preventative action component 206 takes a preventative action to prevent exporting of the payload data. Thus, as shown in FIG. 6, in some embodiments, act 603 includes an act 603a of preventing exporting of the payload data item, such that the preventative action in act 603 comprises preventing the payload data item from being exported from the computer system. For example, in embodiments the preventative action component 206 removes high-entropy payload data items (identified by the high-entropy payload identification component 203 in act 601) from code execution log data as that log data is being exported to a remote computer system by the export component 207.

As mentioned, in some embodiments the preventative action component 206 takes a preventative action to prevent the payload data item from being included in code execution log data. Thus, as shown in FIG. 6, in additional or alternative embodiments, act 603 includes an act 603b of preventing inclusion of the payload data item in the code execution log data, such that the preventative action in act 603 comprises preventing the payload data item from being included in the code execution log data. For example, in embodiments the preventative action component 206 prevents the inclusion of high-entropy data items (identified by the high-entropy payload identification component 203 in act 601) in currently generated code execution log data, and/or removes those high-entropy data items from existing code execution log data.

In various embodiments, preventing the payload data item from being included in the code execution log data comprises replacing the payload data item in the code execution log data with one or more of (i) substitute data, (ii) one or more constraints on the payload data item, or (iii) a code flow override for the particular executable code. These techniques are discussed in more detail in connection with FIGS. 3 and 7, which describe ways to accomplish payload data removal from execution traces.

As mentioned, in some embodiments the preventative action component 206 takes a preventative action to add the payload data item to a block list. Thus, as shown in FIG. 6, in additional or alternative embodiments, act 603 includes an act 603c of adding the payload data item to a block list, such that the preventative action in act 603 comprises adding the payload data item to a block list in reference to the particular executable code, the block list being structured to prevent the payload data item from being included in subsequently generated code execution log data. For example, in embodiments the preventative action component 206 uses the block list interaction component 205 to add high-entropy data items (identified by the high-entropy payload identification component 203 in act 601) to block list 114, in reference to code (identified by the code interaction component 204 in act 602) that interacted with those data items. Thus, act 603a has an effect of preventing inclusion of high-entropy data items in code execution log data that has not yet been generated.

In embodiments, the debugging component 201 operates transitively when preventing inclusion of payload data in code execution log data, such that multiple instances of high-entropy payload data (including derivatives) are excluded from inclusion in code execution log data. For example, in embodiments, when the high-entropy payload identification component 203 determines that the data of a first parameter of a particular function is a high entropy value, the high-entropy payload identification component 203 also identifies any additional code location(s) that also interact with that data (or a copy/derivative thereof). The preventative action component 206 then takes a preventative action, with respect to each of these identified code locations, to exclude inclusion of this data in code execution log data. For example, if the first parameter (or a derivative thereof) is later printed to a screen as a string, then in embodiments the high-entropy payload identification component 203 identifies code that prints this string payload and clears that string payload. In embodiments, this is true even if the printing routine is not in a recorded code path. Thus, in embodiments, the debugging component 201 operates to transitively exclude all instances of high-entropy payload data (including its derivatives) from code execution log data. Thus, in some embodiments of method 600, method 600 is applied transitively to exclude an additional instance of payload data item, or derivative thereof, from inclusion in another record of execution another executable code.

In some embodiments, even though a payload data item is prevented from being exported by the export component 207, is prevented from being included in code execution log data, and/or is removed code execution log data, in some embodiments the preventative action component 206 separately retains these payload data items (e.g., in durable storage 104), while potentially encrypting or otherwise protecting those data times. In embodiments, this retention enables those data times to be later provided to facilitate analysis of the code execution log data, should the need arise. Thus, in some embodiments of method 600, the payload data item is retained at the computer system separate from the code execution log data.

Notably, excluding high-entropy payload data items code execution records, such as by preventing exporting of the payload data item in act 603a, by preventing inclusion of the payload data item in the code execution log data in act 603b, or by adding the payload data item to a block list in act 603c, enables data security to be improved excluding high-entropy data from code execution log data. This has a technical effect of preventing sensitive data items from being inadvertently exposed through code execution log data. Additionally, excluding high-entropy payload data items code execution records decreases the size of code execution log data by removing portions of data, including removing high-entropy data that often is not readily compressible, such as replayable execution traces 113, which has an additional technical effect of conserving computing resources; for example, decreasing the size of replayable execution traces 113 conserves processing resources when analyzing those traces, and conserves the storage and network resources needed to store and transfer those traces.

II. Payload Data Removal from Execution Traces

It was mentioned previously that some embodiments of the debugging component 109 additionally, or alternatively, provide functionality for removing payload data from replayable execution traces 113. These embodiments are based on a recognition that payload data frequently does not materially contribute to many forms of execution trace analysis, such as code and/or data flow analysis, memory locality analysis, memory access pattern analysis, cache usage analysis, race condition analysis, buffer overflow analysis, traditional debugging, and the like. By removing this payload data from execution traces, these embodiments improve data security (i.e., by removing such data execution traces), as well as significantly reduce trace file size.

Conceptually, these embodiments convert an execution trace from one that expressly or inherently captures all inputs and all outputs to each instruction executed (i.e., payload data), to one that contains the actual code that was executed, information about what caused that code to execute the way it did, and memory access patterns (i.e., the memory addresses accessed). In particular, these embodiments process an execution trace to identify payload data items—such as the inputs to and the outputs from executable instructions, functions, and the like. For each identified payload data item, these embodiments determine constraint(s) that execution of code that interacted with the payload data item has placed on the payload data item. These embodiments then replace a value of the payload data item in the execution trace with information that maintains those constraint(s). In embodiments, this information includes the actual executable code that interacted with the payload data item, a memory address of the payload data item, and/or data structured to preserve code flow affected by the payload data item (e.g., a replacement value for the payload data item that preserves the code flow, a specification of valid value(s) s for the data item that preserve the code flow, an instruction of a code path to follow, etc.).

Figure 3:
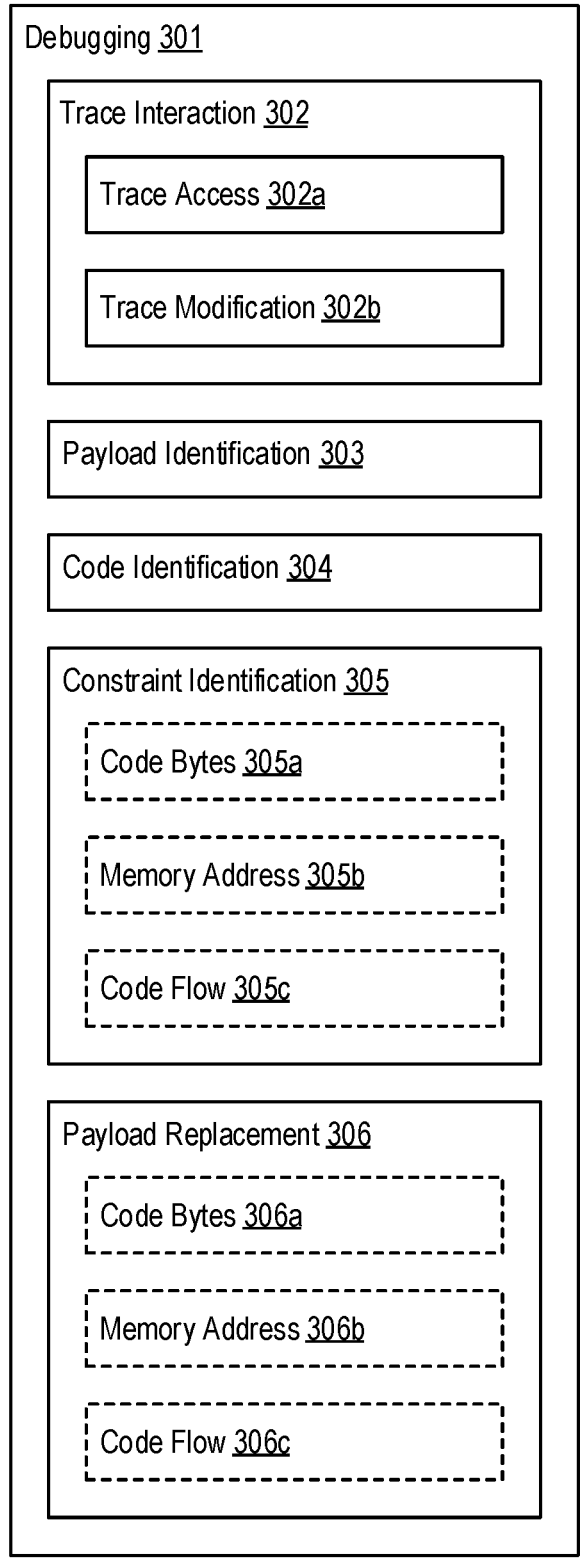
FIG. 3 illustrates detail of a debugging component that is configured to remove payload data from execution traces.

To further demonstrate these concepts, FIG. 3 illustrates an example 300 of a debugging component 301 (e.g., one embodiment of debugging component 109) that is configured to remove payload data from execution traces, including components (e.g., trace interaction component 302, payload identification component 303, code interaction component 304, constraint identification component 305, payload replacement component 306, etc.) that operate to remove payload data from execution traces. The depicted components of the debugging component 301, including their sub-components, represent various functions that the debugging component 301 might implement or utilize in accordance with various embodiments described herein. It will be appreciated, however, that the depicted components—including their identity, sub-components, and arrangement—are presented merely as an aid in describing various embodiments of the debugging component 301 described herein, and that these components are non-limiting to how software and/or hardware might implement various embodiments of the debugging component 301 described herein, or of the particular functionality thereof.

Figure 7:
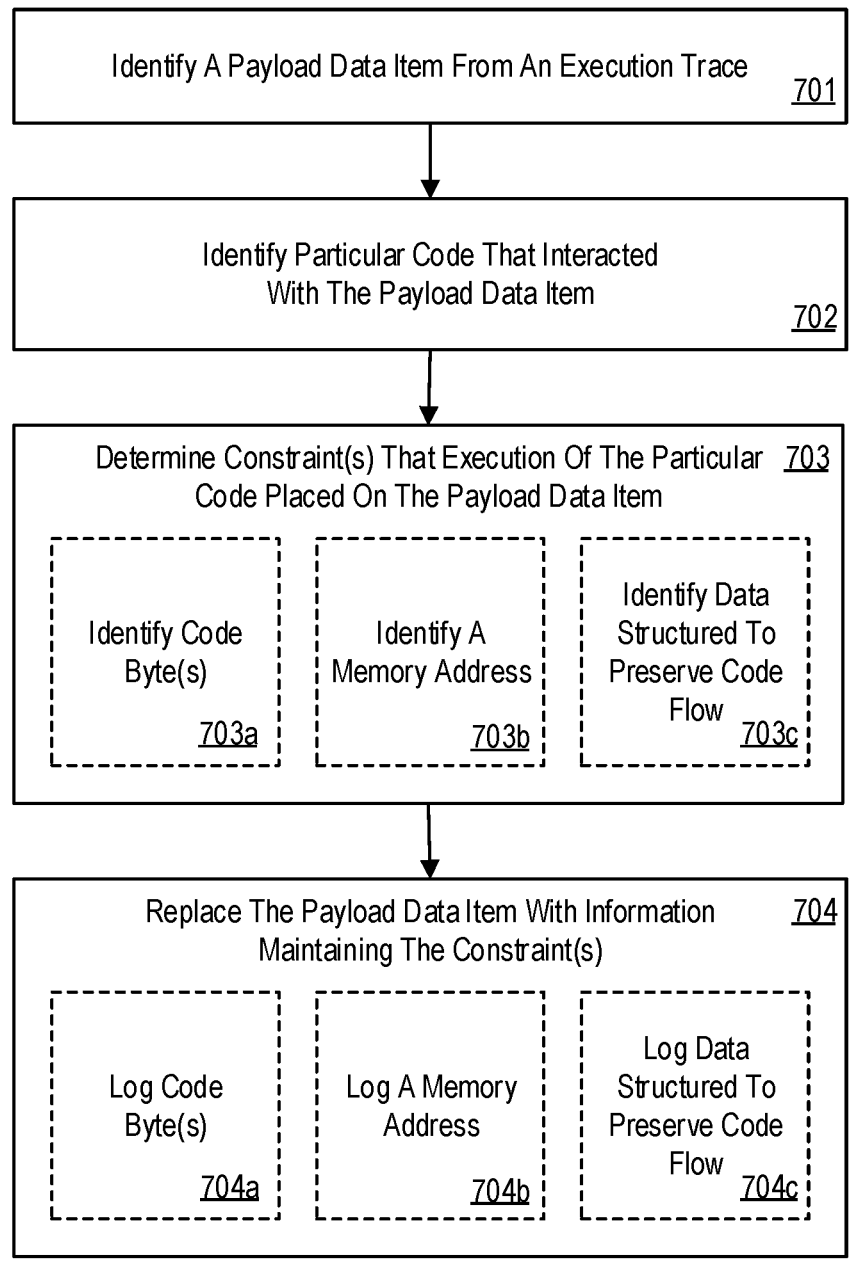
FIG. 7 illustrates a flow chart of an example method for removing payload data from an execution trace.

Debugging component 301 is described in connection with FIG. 7, which illustrates a flowchart of a method 700 for removing payload data from an execution trace. Thus, the following discussion now refers to a method and method acts. Although the method acts may be discussed in certain orders, or may be illustrated in a flow chart as occurring in a particular order, no particular ordering is required unless specifically stated, or required because an act is dependent on another act being completed prior to the act being performed. In embodiments, instructions for implementing method 700 is are encoded as computer-executable instructions (e.g., debugging component 301) stored on a hardware storage device (e.g., durable storage 104) that are executable by a processor (e.g., processor 102) to cause a computer system (e.g., computer system 101) to perform method 700.

The trace interaction component 302 interacts with execution traces, such as replayable execution traces 113. As shown, the trace interaction component 302 includes a trace access component 302a (i.e., to access already existing execution traces) and a trace modification component 302b (i.e., to modify already existing execution traces).

The payload identification component 303 identifies payload items from execution traces accessed by the trace access component 302a. In embodiments, the payload identification component 303 identifies the inputs to, and the outputs from, code instructions, functions, modules, etc. In embodiments, the payload identification component 303 also identifies a memory address (or even a range of memory addresses) corresponding to each payload item. In some embodiments, the payload identification component 303 also identifies a name or label for each payload item—such as a variable name, a structure name, a class name, etc. Turning to FIG. 7, method 700 comprises an act 701 of identifying a payload data item from an execution trace. In some embodiments, act 701 comprises identifying a payload data item within one of replayable execution traces 113 that is accessed by the trace interaction component 302.

The code interaction component 304 identifies code that interacted with each payload data item identified by the payload identification component 303. As mentioned, the payload identification component 303 identifies the inputs to, and the outputs from, code instructions, functions, modules, etc.; thus, the code interaction component 304 identifies the code of these instructions, functions, modules, etc. In embodiments, the code interaction component 304 also identifies from which memory address(es) this code was accessed. Turning to FIG. 7, method 700 comprises an act 702 of identifying particular code that interacted with the payload data item. In some embodiments, act 702 comprises identifying particular executable code that interacted with a payload data item identified by the payload identification component 303 in act 701.

In an example of act 701 and act 702, an execution trace records execution of a string copy function, such as:

```
strcpy (char*dest, char*src)
{
  if (!dest||!src)
    return NULL;
  while (*src)
    *dest++=*src++;
}
```

Now, assuming that the characters stored at a block of memory beginning at the memory address pointed to by *src store the character string "Sample" as follows,

| S | a | m | p | l | e | \0 |
| --- | --- | --- | --- | --- | --- | --- | then after execution of the strcpy( ) function these same characters are copied to another block of memory pointed to by *dest. As examples, when processing this execution trace, the payload identification component 303 identifies, for each iteration of the while loop, one of the characters of the "Sample" string an input to a branch instruction (e.g., corresponding to the while), an input to a memory load instruction, and as an input to a memory store instruction—along with corresponding memory addresses for those payload items. Correspondingly, the code interaction component 304 identifies these instructions as code that interacted with these payload data items—along with corresponding memory addresses for that code.

The constraint identification component 305 identifies constraints that execution of code identified by the code interaction component 304 places on payloads identified by the payload identification component 303. Turning to FIG. 7, method 700 comprises an act 703 of determining constraint(s) that execution of the particular code placed on the payload data item. In some embodiments, act 703 comprises, based on the payload data item and the particular executable code, determining one or more constraints that execution of the particular executable code has placed on the payload data item.

As shown, in embodiments the constraint identification component 305 comprises a code bytes component 305a. As will be appreciated, the actual code that interacted with payload data is an inherent constraint on that payload data as a code input; thus, in embodiments, the code bytes component 305a identifies the actual bytes of code that was executed, for inclusion in an execution trace. In embodiments, the code bytes component 305a identifies these code bytes based on data stored at the code memory addresses identified by the code interaction component 304. As shown in FIG. 7, in embodiments act 703 includes an act 703a of identifying code byte(s). Thus, in some embodiments of act 703, the one or more constraints comprise one or more bytes of the particular executable code. In an example, when operating on the strcpy( ) example above, the code bytes component 305a identifies the actual code of the strcpy( ) function.

As also shown, in embodiments the constraint identification component 305 comprises a memory address component 305b. As will be appreciated, the location at which executable code accessed payload data places a location constraint on that payload data; thus, in embodiments, the memory address component 305b identifies memory addresses at which payload data items were accessed, for inclusion in an execution trace. As shown in FIG. 7, in embodiments act 703 includes an act 703b of identifying a memory address. Thus, in some embodiments of act 703 the one or more constraints comprise a memory address corresponding to the payload data item. In an example, when operating on the strcpy( ) example above, the memory address component 305b identifies memory address each character in the src and dest character strings.

As also shown, in embodiments the constraint identification component 305 comprises a code flow component 305c. As will be appreciated, the code flow resulting from an interaction with payload data places a constraint on possible value(s) of that payload data that would preserve the same code flow; thus, in embodiments, the code flow component 305c identifies a code flow constraint on payload data, for inclusion in an execution trace. As shown in FIG. 7, in embodiments act 703 includes an act 703c of identifying data structured to preserve code flow. Thus, in some embodiments of act 703, the one or more constraints comprise data structured to preserve code flow.

In embodiments, the code flow component 305c identifies data structured to preserve code flow in the form of a replacement value for the payload data item, in which the replacement value is one that preserves proper code flow when replacing an original value of the payload data item. Thus, in some embodiments, act 703c comprises a replacement value for the payload data item, the replacement value structured to preserve code flow.

In some embodiments, the code flow component 305c selects this replacement value based on random value generation, such that act 703c comprises identifying the replacement value based on random value generation. In embodiments, when the code flow component 305c selects a replacement value based on random values, the code flow component 305c generates a random value of the appropriate data size for the payload data item (e.g., using pseudo-random value generation techniques), and then checks whether or not that randomly generated value would preserve code flow if used as a value of the payload data item. If so, then the code flow component 305c selects that randomly generated value as the replacement value. If not, then the code flow component 305c generates and checks new random value(s) until a value that preserves code flow is identified. Notably, in some embodiments, the code flow component 305c permits generation of a random value that is identical to an original value of the payload data item. In an example, when operating on the strcpy( ) example above, the code flow component 305c generates a different random one-byte value for each alphabetic character of the "Sample" string; here, any non-null byte (e.g., any byte other than 0x0) would preserve code flow.

In additional, or alternative, embodiments the code flow component 305c selects this replacement value based on a lookup from a set of available replacement values, such that act 703c comprises identifying the replacement value based on a lookup from a set of available replacement values. In embodiments, when the code flow component 305c selects a replacement value based on a lookup, the code flow component 305c chooses one value from defined set of available replacement values, and then checks whether or not that value would preserve code flow if used as a value of the payload data item. If so, then the code flow component 305c selects that chosen value as the replacement value. If not, then the code flow component 305c chooses and checks other value(s) from the set until a value that preserves code flow is identified. Notably, in some embodiments, the code flow component 305c permits selection of a value that is identical to an original value of the payload data item. In embodiments, the set of available replacement values is populated with values (e.g., 0x0, 0xA, 0xF, etc.) that would promote compressibility of an execution trace that contains many instances of those values. In an example, when operating on the strcpy( ) example above, the code flow component 305*c* generates an available one-byte value for each character of the string from a set of available values; here, any non-null byte, such as 0xA or 0xF, preserves code flow.

In additional, or alternative, embodiments the code flow component 305*c* selects this replacement value based at least on computing a hash of the payload data item, such that act 703*c* comprises generating the replacement value based on computing a hash of the payload data item. In some embodiments, the code flow component 305*c* checks whether or not a generated hash would preserve code flow if used as a replacement value of the payload data item, and if so the code flow component 305*c* selects that hash as the replacement value. Thus, in some embodiments of act 703*c*, replacing the value of the payload data item in the execution trace with information maintaining the one or more constraints comprises replacing the value of the payload data item with the hash. In embodiments, if the generated hash does not preserve code flow if used as a replacement value of the payload data item, then the code flow component 305*c* uses one of the other replacement value selection techniques discussed herein (e.g., a randomly generated value, a value selected from a set of available replacement values, etc.), and tags that replacement value with the hash. Thus, in some embodiments of act 703*c*, replacing the value of the payload data item in the execution trace with information maintaining the one or more constraints comprises tagging the replacement value with the hash. In an example, when operating on the strcpy( ) example above, the code flow component 305*c* generates a hash of each alphabetic character of the string. Here, these hashes are non-null, so they preserve code flow and are used as replacements for each alphabetic character of the string.

In embodiments, when the code flow component 305*c* selects a replacement value based on hashing, the code flow component 305*c* hashes a value of the payload data item, either alone, or in combination with a salt. Thus, in some embodiments of act 703*c*, computing the hash of the payload data item comprises applying a salt to the payload data item. In some embodiments, the code flow component 305*c* uses the same salt when hashing values in a set of traces that are being analyzed for a common purpose, such as to analyze a particular bug or defect. In this way, payloads having the same value will be replaced (or at least tagged) with the same hash across this set of traces and can thus be associated with each other during analysis. However, if different salts are used with for other sets of traces, overall obfuscation of the payload across all traces is preserved because it will have a different hash when different salts are used.

In additional, or alternative, embodiments the code flow component 305*c* selects this replacement value based on execution of a constraint solver (e.g., using Boolean Satisfiability Problem (SAT) techniques), such that act 703*c* comprises identifying the replacement value based on execution of a constraint solver on at least the particular executable code. In embodiments, when the code flow component 305*c* selects a replacement value based on a constraint solver, the code flow component 305*c* uses a constraint solver to analyze the code that interacted with the payload data item. In an example, when operating on the strcpy( ) example above, the code flow component 305*c* executes a constraint solver on the code making up the while loop.

In embodiments, the code flow component 305*c* identifies data structured to preserve code flow in the form of a specification of a set of one or more valid values for the payload data item. Thus, in some embodiments of act 703*c*, the data structured to preserve code flow comprises a specification of a set of one or more valid values for the payload data item. A specification of a set of one or more valid values can take a variety of forms, such as a range of values (e.g., one to ten), a set of values (e.g., one, two, four, eight, and ten), a flag (e.g., zero or non-zero), a bounding value (e.g., less than seven) and the like. In an example, when operating on the strcpy( ) example above, the code flow component 305*c* specifies that each alphabetic character of the "Sample" string can be replaced by a non-null character.

In embodiments, the code flow component 305*c* identifies data structured to preserve code flow in the form of an instruction of a code path to follow. Thus, in some embodiments of act 703*c*, the data structured to preserve code flow comprises an instruction of a code path to follow in the particular executable code. An instruction of a code path to follow can include, for example, an indication of which branch of a control statement should be taken, and indication of whether a statement should evaluate to true or false, etc. In an example, when operating on the strcpy( ) example above, for each alphabetic character of the "Sample" string the code flow component 305*c* indicates that the while loop should continue, and for the terminating null character the code flow component 305*c* indicates that the while loop should terminate. As will be appreciated, by specifying instructions of code paths to follow, related payload data can be entirely omitted from a trace.

The payload replacement component 306 performs a payload data replacement, based on the constraint(s) identified by the constraint identification component 305 in act 703. Turning to FIG. 7, method 700 comprises an act 704 of replacing the payload data item with information maintaining the constraint(s). In some embodiments, act 704 comprises replacing a value of the payload data item in the execution trace with information maintaining the one or more constraints.

As discussed, in some embodiments the one or more constraints include the actual code that interacted with payload data (code bytes component 305*a*). Correspondingly, in embodiments the payload replacement component 306 comprises a code bytes component 306*a*, which logs at least the code bytes that interacted with payload data into an execution trace. Thus, in some embodiments of act 704 the information maintaining the one or more constraints includes the one or more bytes of the particular executable code. As shown, in some embodiment, act 704 therefore includes an act 704*a* of logging code byte(s). In embodiments, act 704*a* has a technical effect of enabling access to executable code to facilitate execution trace analysis.

As discussed, in some embodiments the one or more constraints include the actual code that interacted with payload data (code bytes component 305*a*). Correspondingly, in embodiments the payload replacement component 306 comprises a memory address component 306*b*, which logs at least the memory address(es) corresponding to payload data. Thus, in some embodiments of act 704 the information maintaining the one or more constraints includes the memory address. As shown, in some embodiment, act 704 therefore includes an act 704*b* of logging a memory address. In embodiments, act 704*b* has a technical effect of enabling analysis of memory usage (e.g., code and/or data flow analysis, memory locality analysis, memory access pattern analysis, cache usage analysis, race condition analysis, buffer overflow analysis, traditional debugging, etc.), even without the presence of original payload data.

As discussed, in some embodiments the one or more constraints include the code flow resulting from an interaction with payload data (code flow component 305c). Correspondingly, in embodiments the payload replacement component 306 comprises a code flow component 306c, which logs at least data structured to preserve code flow. Thus, in some embodiments of act 704 the information maintaining the one or more constraints includes the data structured to preserve code flow which can comprise, as examples, a replacement value for the payload data item or an instruction of a code path to follow in the particular executable code. As shown, in some embodiments, act 704 therefore includes an act 704c of logging data structured to preserve code flow. In embodiments, act 704c has a technical effect of replacing potentially sensitive data in an execution trace with data structured to preserve code flow, which promotes data security. Additionally, when the replacement data is smaller than the original payload data, and/or when the replacement data has a compressible data pattern, act 704 has a technical effect of reducing trace file size. Thus, the efficiency of trace analysis, storage, and transfer is improved (in terms of processing power required, computation time, storage resources, and network utilization) because there is less data to process, store, and transfer.

In embodiments, similar to debugging component 201, the debugging component 301 operates transitively when removing/replacing payload data from replayable execution traces 113, such that multiple instances of that payload data (including derivatives) are removed/replaced from replayable execution traces 113. For example, if the strcpy( ) function described above is a ToLower( ) function that comprises the following:

while (*src)
    if (*src>='A'&&*src<='Z');
        *src=*src-'A'+'a' then in embodiments the code interaction component 304 also identifies this ToLower( ) function (or a portion thereof) as code that interacts with the character string pointed to by *src, and the constraint identification component 305 identifies constraints on the values of the character string that also cause the right number of hits into the "if" statement in the ToLower( ) function (e.g., by choosing a replacement value for the "S" character that is also a capital letters, choosing replacement values for the "a," "m," "p," "l," and "e" characters that are any other non-null non-capital letters). Thus, in some embodiments of method 700, method 700 is applied transitively method is applied transitively to replace an additional instance of payload data item, or derivative thereof, in the execution trace with information maintaining the one or more constraints.

Accordingly, at least some embodiments herein operate to remove payload data from execution traces, which has a technical effect of promoting data security, by preventing sensitive data items from being inadvertently exposed through execution traces. Additionally, excluding payload data from execution traces can greatly increase the compressibility of those execution traces. Either way, excluding payload data from execution traces can dramatically decrease the size of execution traces, which has an additional technical effect of conserving computing resources; for example, decreasing the size of execution traces conserves processing resources when analyzing those execution traces, and conserves the storage and network resources needed to store and transfer execution traces.

The disclosure herein discussed embodiments for using an entropy analysis to prevent inclusion of payload data in code execution log data, as well as embodiments for removing payload data from replayable execution traces. It is noted that these two embodiments can be practiced singly, or in combination. For example, when discussing the entropy analysis embodiments, it was mentioned that preventing a payload data item from being included in code execution log data could comprise replacing the payload data item with one or more of substitute data, constraint(s) on the payload data item, or a code flow override; notably, these prevention techniques disclosed further in connection with the payload data removal embodiments. Additionally, the payload data removal embodiments identify payload data items for removal, and in some implementations payload data items are identified based, at least in part, on an entropy analysis.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented at a computer system that includes a processor, for preventing inclusion of payload data in code execution log data, the method comprising:
   determining that a payload data item associated with code execution log data has entropy exceeding a defined entropy threshold;
   identifying a particular executable code that interacted with the payload data item; and
   taking a preventative action that excludes the payload data item from inclusion with a record of execution of the particular executable code.

2. The method of claim 1, wherein determining that the payload data item has entropy exceeding the defined entropy threshold comprises determining that the payload data item has intrinsic entropy exceeding the defined entropy threshold.

3. The method of claim 2, wherein determining that the payload data item has intrinsic entropy exceeding the defined entropy threshold comprises at least one of:

computing a ratio of a number of bits of entropy in the payload data item versus a total number of bits in the payload data item; or computing a compressibility of the payload data item.

4. The method of claim 1, wherein determining that the payload data item has entropy exceeding the defined entropy threshold comprises determining that the payload data item has contextual entropy exceeding the defined entropy threshold, the contextual entropy being relative to a plurality related payload data items identified from a plurality of related code execution logs.

5. The method of claim 1, wherein identifying the particular executable code that interacted with the payload data item comprises identifying executable code that consumed the payload data item.

6. The method of claim 1, wherein identifying the particular executable code that interacted with the payload data item comprises identifying executable code that generated the payload data item.

7. The method of claim 1, wherein identifying the particular executable code that interacted with the payload data item comprises identifying a particular executable instruction.

8. The method of claim 1, wherein identifying the particular executable code that interacted with the payload data item comprises identifying a particular function.

9. The method of claim 1, wherein the preventative action comprises preventing the payload data item from being exported from the computer system.

10. The method of claim 1, wherein the preventative action comprises preventing the payload data item from being included in the code execution log data.

11. The method of claim 10, wherein preventing the payload data item from being included in the code execution log data comprises replacing the payload data item in the code execution log data with one or more of (i) substitute data, (ii) one or more constraints on the payload data, or (iii) a code flow override for the particular executable code.

12. The method of claim 1, wherein the preventative action comprises adding the payload data item to a block list in reference to the particular executable code, the block list being structured to prevent the payload data item from being included in a subsequently generated code execution log data.

13. The method of claim 1, wherein determining that the payload data item has entropy exceeding the defined entropy threshold comprises identifying the payload data item from a block list based at least on a reference to the particular executable code.

14. The method of claim 1, wherein determining that the payload data item has entropy exceeding the defined entropy threshold comprises identifying the payload data item during a post-processing of the code execution log data.

15. The method of claim 1, wherein the method is applied transitively to exclude an additional instance of payload data item, or derivative thereof, from inclusion in another record of execution another executable code.

* * * * *